May 19, 1953 E. GABOURY Re. 23,658

OVERHEAD CONVEYER TROLLEY

Original Filed June 10, 1946 2 Sheets-Sheet 1

Inventor

Eugene Gaboury

By

J. S. Murray

Attorney

May 19, 1953 E. GABOURY Re. 23,658

OVERHEAD CONVEYER TROLLEY

Original Filed June 10, 1946 2 Sheets-Sheet 2

INVENTOR.
Eugene Gaboury
BY
J. S. Murray
ATTORNEY

Reissued May 19, 1953

Re. 23,658

UNITED STATES PATENT OFFICE 23,658

OVERHEAD CONVEYER TROLLEY

Eugene Gaboury, Van Dyke, Mich.

Original No. 2,517,652, dated August 8, 1950, Serial No. 675,581, June 10, 1946. Application for reissue February 26, 1953, Serial No. 339,196

7 Claims. (Cl. 198—177)

This invention relates to trolleys and particularly conveyor trolleys.

A quite common type of conveyor comprises a traveling chain suspended beneath a coextensive track, and supported at suitable intervals by trolleys having wheels engaging said track. The track is commonly an I-beam, its lower flanges forming a runway, and each trolley commonly comprises a pair of wheels traveling such runway and hanger arms suspending the chain. The hanger arms are commonly substantial duplicates, bolted together beneath the track, and thus separable for engaging the trolley with and disengaging it from the track. Manipulation of the bolts and their associated nuts requires a suitable wrench and time is lost in obtaining the wrench and unscrewing the nuts and bolts, particularly when such fastenings are not easily accessible, as is often the case. When a conveyor of the described character fails, this commonly entails idleness for many men and machines, it being hence vital to minimize time required in removing and replacing a defective trolley or other defective portion of the conveyor.

The object of the invention is to provide an improved means for quickly connecting and disconnecting the paired hanger members of a conveyor trolley, eliminating the usual bolts and nuts, requiring no special tools, and effecting a material time saving as compared to practices now common.

More specifically, the invention provides for interlocking the paired hanger members by a key such as may be tapped into place or driven out in a few seconds.

These and various other objects are attained by the construction hereinafter described and illustrated in the accompanying drawings, wherein.

Figure 2:
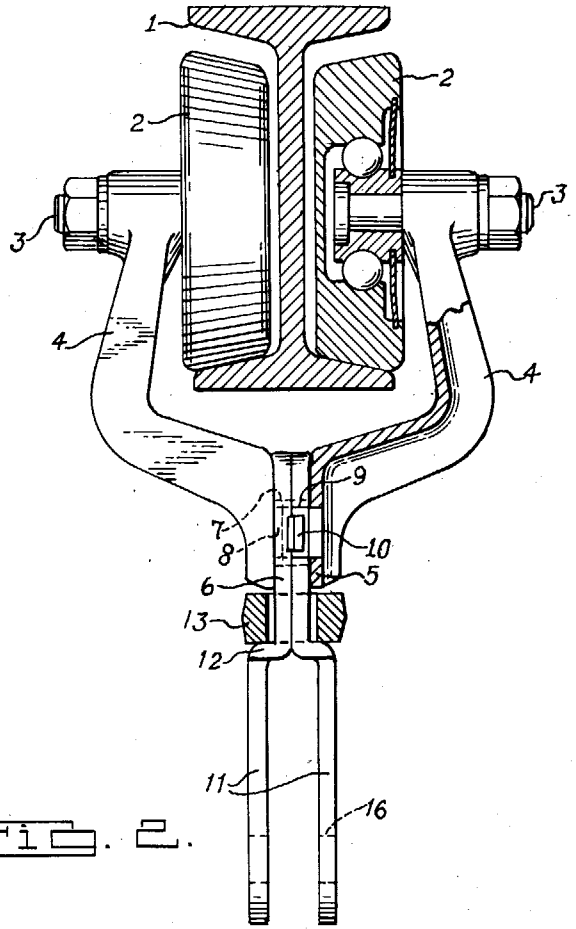
Fig. 2 is an end elevational view of the same, showing the track in cross section.
Figure 1:
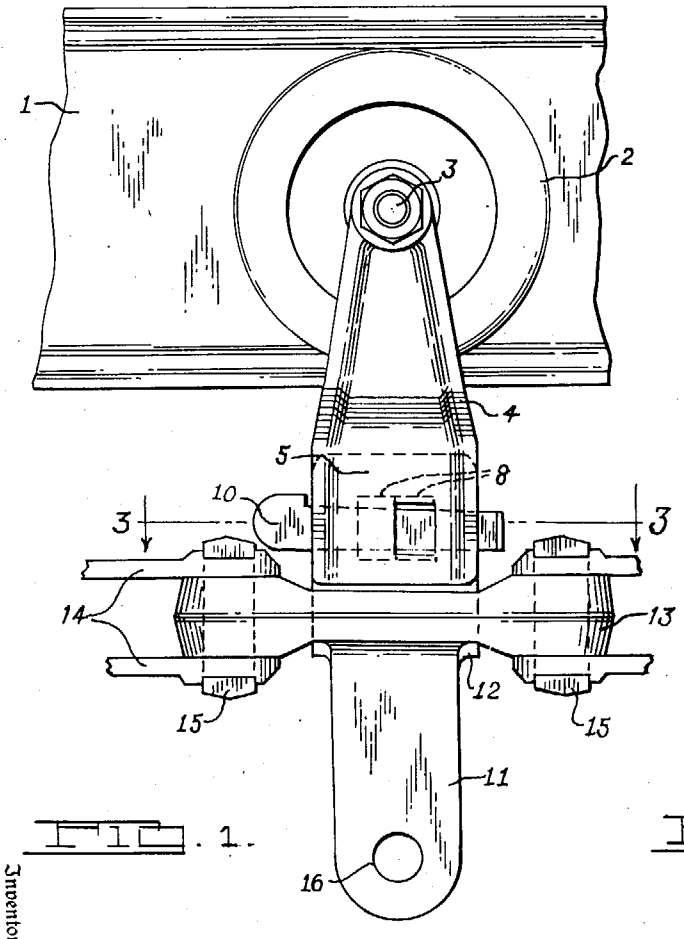
Fig. 1 is a side elevational view of my improved trolley, its track, and a portion of a chain conveyor.

In these views the reference character 1 designates a track of I-beam form, the lower flanges of which form a runway for a pair of trolley wheels 2. Said wheels travel at opposite sides of the web of the beam 1, being journaled on aligned studs 3 fixed on and projecting toward each other from the upper ends of a pair of substantially duplicate hanger arms 4. The upper portions of such arms are adequately spaced to clear the lower flange portion of the rail 1, beneath which said arms have flat parallel vertical end portions 5 in relatively close mutual proximity. Between the portions 5 is clamped a plate 6 formed by the upper end portion of a third hanger arm, and having a rectangular aperture 7 to receive a pair of arched metal keepers 8 projecting integrally and oppositely from the portions 5, in a side-by-side relation, and preferably struck out of suitable openings in the portions 5. The plate 6 has grooves 9 in its opposite faces, oppositely extending from the aperture 7, either of which may accommodate a key 10 driven between the portions 5 and entering both keepers 8. This key preferably has a slight taper, effecting its locking in the keepers when sufficiently inserted. The effect of said key is to very firmly and strongly secure the three hanger arms in assembled relation. The hanger arm comprising the plate 6 extends materially below the paired arms being bifurcated and having its furcations 11 spaced to form a pair of shoulders 12 to support a loop-forming link 13 of a conveyor chain. Such chain further comprises upper and lower link members 14 of elongated plate form and suitably headed pins 15 connecting the links 13 and 14. The furcations 11 are formed with aligned apertures 16 to receive a hook (not shown) or some other form of load carrier. It is preferred to form the arm 6, 11 of two sheet metal stampings, welded face to face in their portions 6 and each forming one of the furcations 11.

Figure 3:
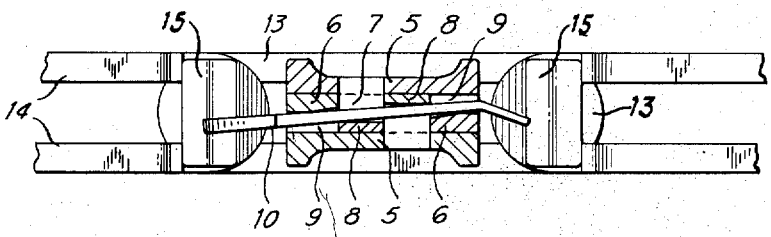
Fig. 3 is a horizontal sectional view taken on the line 3—3 of Fig. 1.
Figure 6:
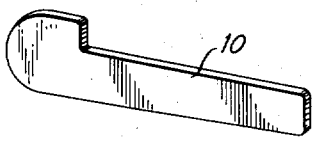
Fig. 6 is a perspective view of the key used to interlock the hanger arms of the trolley.
Figure 5:
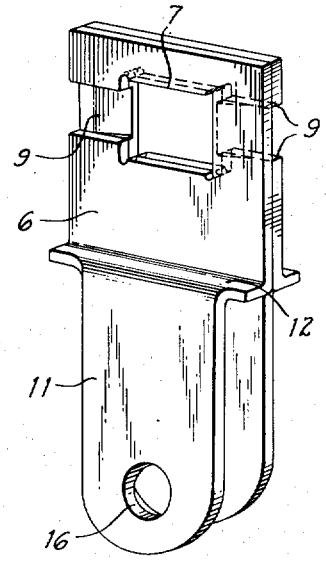
Fig. 5 is a perspective view of a chain-engaging hanger arm.
Figure 4:
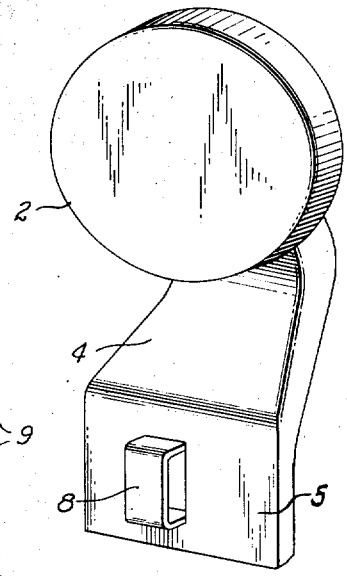
Fig. 4 is a perspective view of one of the paired, wheel-mounting hanger arms of the trolley.

A primary advantage of the described trolley lies in the ease with which it may be assembled or disassembled. Obviously, the key 10 may be quickly driven into or out of place and may be secured against removal by slightly bending its smaller end as shown in Fig. 3. While a hammer is preferably used to drive the key, an iron bar or any fairly heavy object will serve the purpose in an emergency. For manipulation of nuts and bolts by a wrench as in prior practice, considerable clearance room is necessary and there must be ample light. The key 10 may be driven in or out despite highly restricted working space and the operation requires a minimum of light. In addition to the time saving effected, there is a considerable less expense entailed in producing the improved interlocking provision as compared to nuts and bolts. It may be noted finally that nuts and bolts are not well suited to use where moisture prevails either intermittently or continuously, since consequent rusting deteriorates such fastenings and sometimes renders their manipulation decidedly difficult. My improved connection, while not necessarily immune to rust, cannot be materially impeded by rust from operating in its intended manner.

What I claim is:

1. A conveyor trolley comprising a pair of opposed hanger arms having mutually confronting lower portions and spaced upper portions, a pair of substantially aligned rollers mounted upon and between said upper portions, a pair of keepers respectively carried by the respective lower portions of said arms, a key interposed between said lower portions and engaging in said keepers to lock the arms in unitary relation, and a plate interposed between said lower portions and apertured to receive both keepers.

2. A conveyor trolley comprising a pair of opposed hanger arms having mutually confronting lower portions and spaced upper portions, a pair of arched loops respectively carried by the respective lower portions of said arms, and a key interposed between said lower portions and inserted in said loops and thereby forming a means to lock the arms in unitary relation.

3. A conveyor trolley comprising a pair of opposed hanger arms having mutually confronting lower portions and spaced upper portions, a pair of substantially aligned rollers mounted upon and between said upper portions, a pair of keepers respectively carried by the respective lower portions of said arms, a key interposed between said lower portions and inserted in said keepers to lock the arms in unitary relation, and a plate interposed between said lower portions and having an aperture to receive both keepers, said plate being grooved from its aperture to its periphery to receive said key.

4. A conveyor trolley comprising a pair of opposed hanger arms having mutually confronting lower portions and spaced upper portions, a pair of substantially aligned rollers mounted upon and between said upper portions, a pair of keepers respectively carried by the respective lower portions of said arms, a key interposed between said lower portions and inserted in said keepers to lock the arms in unitary relation, a third hanger arm interposed between the lower portions of said paired arms, and apertured to receive said keepers and depending below the paired arms to carry a conveyor.

5. A conveyor trolley comprising a pair of opposed hanger arms having mutually confronting lower portions, a pair of substantially aligned rollers respectively mounted on the respective upper portions of said arms, a pair of keepers respectively carried by the respective lower portions of said arms, a key inserted in said keepers and thereby locking the arms in unitary relation, a plate interposed between said lower portions and having an aperture receiving both keepers, said plate having grooves extending from said aperture in opposite directions and in opposite faces of the plate to accommodate said key.

6. A conveyor trolley comprising a pair of opposed hanger arms having mutually confronting lower portions and spaced upper portions, a pair of relatively offset loops respectively carried by the respective lower portions of said arms, and forming substantially aligned sockets, and a key interposed between said lower portions and inserted in said sockets and thereby forming a means to lock the arms in unitary relation.

7. In a conveyor trolley as set forth in claim 6, a plate interposed between said lower portions and apertured to receive said loops and grooved from its aperture to its periphery to receive said key, whereby said key locks said plate to the arms.

EUGENE GABOURY.

References Cited in the file of this patent or the original patent

UNITED STATES PATENTS

| Number | Name | Date |
|---|---|---|
| 695,628 | Schlieper | Mar. 18, 1902 |
| 1,721,316 | Pribil | July 16, 1929 |
| 2,075,261 | Bishop | Mar. 30, 1937 |
| 2,095,022 | Bishop | Oct. 5, 1937 |
| 2,242,065 | Gaboury | May 13, 1941 |
| 2,265,248 | Pomeroy | Dec. 9, 1941 |